United States Patent
Bjorck et al.

(10) Patent No.: US 7,870,804 B2
(45) Date of Patent: Jan. 18, 2011

(54) MULTI-SPEED DUAL CLUTCH TRANSMISSION

(75) Inventors: Per-Gunnar Bjorck, Trollhattan (SE); Mikael Mohlin, Kungalv (SE); John A. Diemer, Farmington Hills, MI (US); Patrick S. Portell, Plymouth, MI (US); Henryk Sowul, Oxford, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 517 days.

(21) Appl. No.: 11/937,369

(22) Filed: Nov. 8, 2007

(65) Prior Publication Data
US 2008/0134820 A1 Jun. 12, 2008

Related U.S. Application Data

(60) Provisional application No. 60/873,646, filed on Dec. 8, 2006.

(51) Int. Cl.
*F16H 3/08* (2006.01)
(52) U.S. Cl. .......................................... 74/331; 74/330
(58) Field of Classification Search .................... 74/330, 74/331
See application file for complete search history.

(56) References Cited

U.S. PATENT DOCUMENTS

| | | | |
|---|---|---|---|
| 6,209,407 B1 * | 4/2001 | Heinzel et al. | 74/331 |
| 6,250,171 B1 * | 6/2001 | Sperber et al. | 74/331 |
| 7,225,696 B2 * | 6/2007 | Gitt | 74/340 |
| 7,258,032 B2 * | 8/2007 | Kim | 74/330 |
| 7,426,880 B2 * | 9/2008 | Caenazzo et al. | 74/330 |
| 7,478,572 B2 * | 1/2009 | Maten et al. | 74/340 |
| 7,640,818 B2 * | 1/2010 | Carey et al. | 74/330 |
| 7,644,639 B2 * | 1/2010 | Hendrickson et al. | 74/370 |
| 7,669,497 B2 * | 3/2010 | Borgerson et al. | 74/340 |
| 2005/0081661 A1 | 4/2005 | Kim | |
| 2005/0115345 A1 | 6/2005 | Gumpoltsberger et al. | |
| 2005/0252325 A1 * | 11/2005 | Stevenson | 74/325 |
| 2006/0169078 A1 * | 8/2006 | Hiraiwa | 74/331 |

FOREIGN PATENT DOCUMENTS

| | | |
|---|---|---|
| DE | 10200401086 A1 | 9/2005 |
| FR | 2846064 | 10/2005 |
| JP | 11051125 A | 2/1999 |
| WO | WO2005093289 A1 | 10/2005 |

* cited by examiner

*Primary Examiner*—Tisha D Lewis

(57) ABSTRACT

A transmission is provided having an input member, an output member, a dual clutch assembly, a plurality of countershafts, a plurality of co-planar gear sets, a plurality of interconnecting members, and a plurality of torque transmitting devices. The torque transmitting devices include synchronizer assemblies.

23 Claims, 1 Drawing Sheet

MULTI-SPEED DUAL CLUTCH TRANSMISSION

CROSS-REFERENCE TO RELATED APPLICATIONS

This application claims the benefit of U.S. Provisional Application No. 60/873,646, filed on Dec. 8, 2006. The disclosure of the above application is incorporated herein by reference.

TECHNICAL FIELD

The present disclosure relates to transmissions, and more particularly to a multiple speed transmission having a dual clutch assembly and dual countershafts.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

The addition of clutches, brakes, and gear sets to achieve these gear ratios and torque ranges may result in inefficient or undesirable transmission weights and sizes. Accordingly, there is a need in the art for a transmission having improved packaging while providing desirable gear ratios and torque ranges.

SUMMARY OF THE INVENTION

The present invention provides a transmission having an input member, an output member, a dual clutch assembly, a plurality of countershafts, a plurality of co-planar gear sets, a plurality of interconnecting members, and a plurality of torque transmitting devices. The torque transmitting devices include synchronizer assemblies.

One embodiment of the transmission of the present invention includes an input member, an output member, a first, second, third, fourth, fifth, sixth, and seventh gear set each having at least a first gear and a second gear, wherein the output member is continuously connected with one of the gear sets, a first interconnecting member continuously connected to the fourth, fifth, and sixth gear sets, a second interconnecting member continuously connected with the first and third gear sets, a first countershaft continuously connected to the seventh gear set, a second countershaft continuously connected to the seventh gear set, and a dual clutch assembly selectively engageable to interconnect the input member with one of the first interconnecting member and the second interconnecting member. Four synchronizer assemblies selectively couple one of the first, second, third, fourth, fifth, and sixth gear sets with one of the first and second countershafts. The dual clutch assembly and four synchronizer assemblies are selectively engageable in combinations of at least two to establish at least seven forward speed ratios and at least one reverse speed ratio between the input member and the output member.

In one aspect of the present invention, the first countershaft is located radially outward from and parallel to the input member.

In another aspect of the present invention, the second countershaft is located radially outward from and parallel to the input member.

In yet another aspect of the present invention, the output member is located radially outward from and parallel to the input member.

In yet another aspect of the present invention, the first interconnecting member is located within and concentric with the second interconnecting member.

In yet another aspect of the present invention, a torque converter is continuously connected with the input member.

In yet another aspect of the present invention, the dual clutch assembly includes a first clutch for selectively connecting the input member with the first interconnecting member.

In yet another aspect of the present invention, the dual clutch assembly includes a second clutch for selectively connecting the input member with the second interconnecting member.

In yet another aspect of the present invention, the first gear and second gear within each of the first, second, third, fourth, fifth, sixth, and seventh gear sets are radially aligned.

In yet another aspect of the present invention, the first gear set includes a third gear continuously connected to an idler shaft located radially outward from and parallel to the first countershaft, and wherein the third gear is intermeshed with the first gear and the second gear of the first gear set.

In yet another aspect of the present invention, the second gear of the second gear set is continuously connected to the idler shaft, and wherein the first gear and the second gear of the second gear set are intermeshed.

In yet another aspect of the present invention, the third gear set includes a third gear and the first gear of the third gear set is intermeshed with the third gear and the second gear of the first gear set.

In yet another aspect of the present invention, the fourth gear set includes a third gear and the first gear of the fourth gear set is intermeshed with the third gear and the second gear of the fourth gear set.

In yet another aspect of the present invention, the seventh gear set includes a third gear and the first gear of the seventh gear set is intermeshed with the third gear and the second gear of the seventh gear set.

In yet another aspect of the present invention, the first, second, and third gears of the first, third, fourth and seventh gear sets are radially aligned.

In yet another aspect of the present invention, a first of the four synchronizer assemblies selectively connects one of the first gear set and the third gear set to the first countershaft.

In yet another aspect of the present invention, a second of the four synchronizer assemblies selectively connects one of the second gear set and the third gear set to the second countershaft.

In yet another aspect of the present invention, a third of the four synchronizer assemblies selectively connects one of the fourth gear set and the sixth gear set to the first countershaft.

In yet another aspect of the present invention, a fourth of the four synchronizer assemblies selectively connects one of the fourth gear set and the fifth gear set to the second countershaft.

In yet another aspect of the present invention, the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set.

In yet another aspect of the present invention, the output member is continuously connected with the seventh gear set.

The above features and advantages and other features and advantages of the present invention are readily apparent from the following detailed description of the best modes for carrying out the invention when taken in connection with the accompanying drawings.

DETAILED DESCRIPTION

Figure 1:
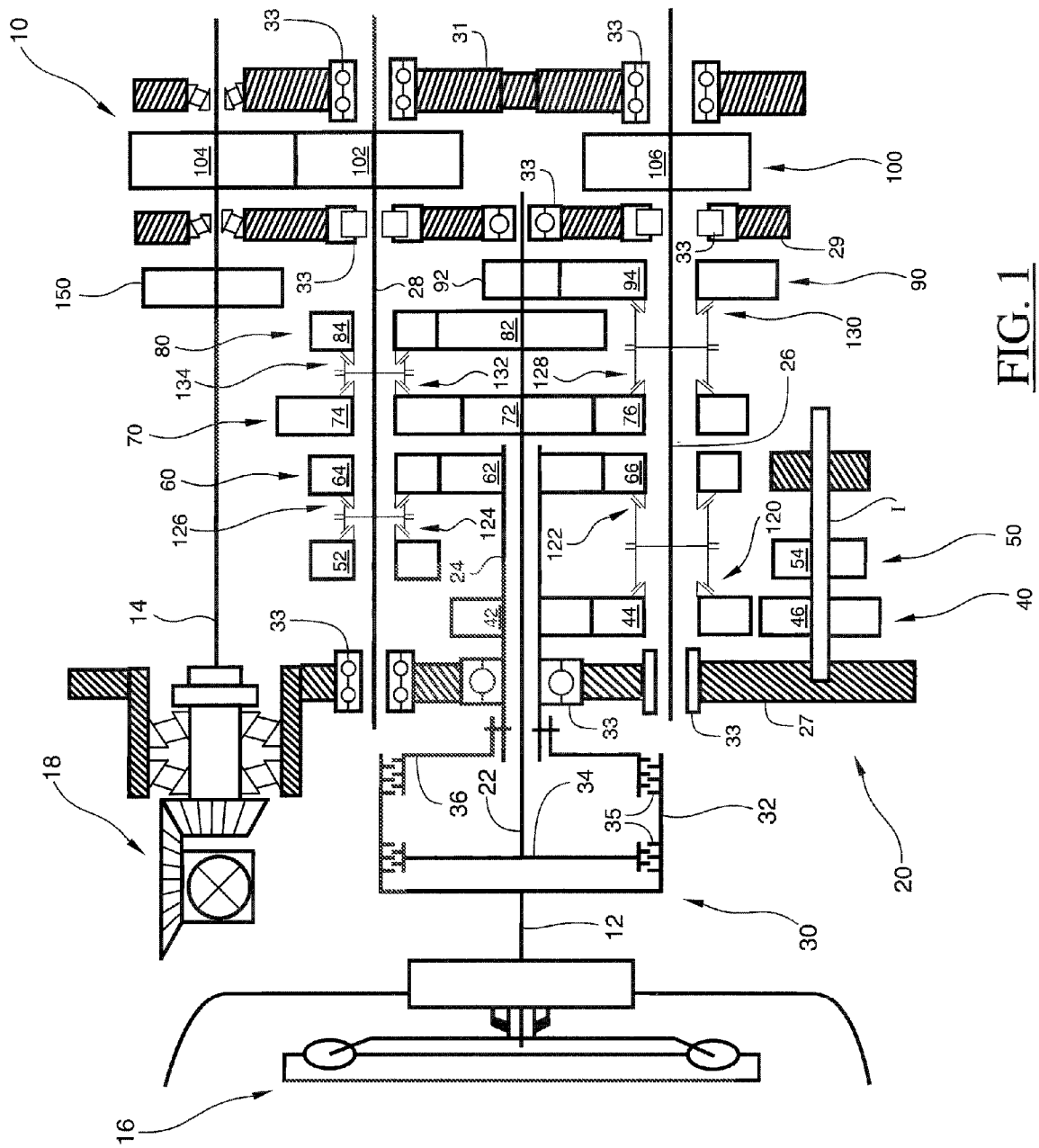
FIG. 1 is a diagram of an embodiment of a multiple speed transmission according to the principles of the present invention.

Referring to the drawings, wherein like reference numbers refer to like components, in FIG. 1 a multi-speed transmission 10 is depicted. The transmission 10 includes an input member 12 and output member 14. In the present embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 10 includes a countershaft gearing arrangement 20 that includes interconnecting shafts, countershafts, co-planar intermeshing gear sets and selectively engageable synchronizers as will be described herein. For example, the countershaft gearing arrangement 20 includes a first interconnecting shaft or member 22 and a second interconnecting shaft or member 24, which is preferably a sleeve shaft concentric with the first interconnecting shaft 22. The countershaft gearing arrangement 20 further includes a first countershaft 26 and a second countershaft 28. The countershafts 26 and 28 are both spaced apart from and parallel with the input shaft 12, the output shaft 14 and the interconnecting shafts 22, 24. The output shaft 14, the interconnecting shafts 22, 24 and the countershafts 26, 28 are supported by a plurality of support members including a first housing member 27, a second housing member 29, and a third housing member 31. The housing members 27, 29, 31 are fitted with bearings 33 for rotatably supporting the output shaft 14, the first and second interconnecting shafts 22, 24, and the countershafts 26, 28. In the embodiment provided, housing member 27 is disposed closest to the torque converter 16 and the final drive unit 18. Housing member 29 is disposed between housing member 27 and housing member 31.

A dual clutch 30 is connected between input shaft 12 and first and second interconnecting shafts 22, 24. The dual clutch 30 includes a clutch housing 32 connected for common rotation with input shaft 12. Further, dual clutch 30 has first and second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates 35 mounted thereon that interact to form a friction clutch. Further, clutch element 34 is connected for common rotation with first interconnecting shaft 22 and clutch element 36 is connected for common rotation with second interconnecting shaft 24. Thus, selective engagement of clutch element 34 with clutch housing 32 connects the input shaft 12 for common rotation with first interconnecting shaft 22 and selective engagement of clutch element 36 with clutch housing 32 connects the input shaft 12 for common rotation with second interconnecting shaft 24.

The countershaft gearing arrangement 20 also includes co-planar, intermeshing gear sets 40, 50, 60, 70, 80, 90 and 100. In the embodiment provided, gear sets 40, 50, 60, 70, 80, and 90 are disposed between housing member 27 and housing member 29 and gear set 100 is disposed between housing member 29 and housing member 31.

Gear set 40 includes gear 42, gear 44 and idler gear 46. Gear 42 is connected for common rotation with the second interconnecting shaft 24 and intermeshes with gear 44 and idler gear 46. Gear 44 is selectively connectable for common rotation with countershaft 26. Idler gear 46 is rotatable about idler axis I.

Co-planar gear set 50 includes gear 52 and gear 54. Gear 52 is selectively connectable for common rotation with second countershaft 28 and intermeshes with idler gear 54. Idler gear 54 is rotatable about idler axis I.

Co-planar gear set 60 includes gear 62, gear 64 and gear 66. Gear 62 is connected for common rotation with second interconnecting shaft 24 and intermeshes with gear 64 and gear 66. Gear 64 is selectively connectable for common rotation with second countershaft 28. Gear 66 is selectively connectable for common rotation with first countershaft 26.

Co-planar gear set 70 includes intermeshing gear 72, gear 74 and gear 76. Gear 72 is connected for common rotation with first interconnecting shaft 22 and intermeshes with gears 74, 76. Gear 74 is selectively connectable with second countershaft 28. Gear 76 is selectively connectable with second countershaft 26.

Co-planar gear set 80 includes intermeshing gear 82 and gear 84. Gear 82 is connected for common rotation with first interconnecting shaft 22 and intermeshes with gear 84. Gear 84 is selectively connectable for common rotation with second countershaft 28.

Gear set 90 includes co-planar, intermeshing gear 92 and gear 94. Gear 92 is connected for common rotation with first interconnecting shaft 22 and intermeshes with gear 94. Gear 94 is selectively connectable for common rotation with the first countershaft 26.

Gear set 100 includes co-planar, intermeshing gear 102, gear 104 and gear 106. Gear 102 is connected for common rotation with second countershaft 28. Gear 102 intermeshes with gear 104. Gear 104 is connected for common rotation with output shaft 14. Gear 104 intermeshes with gear 106. Gear 106 is connected for common rotation with first countershaft 26.

The transmission 10 further includes a plurality of selectively engageable synchronizers 120, 122, 124, 126, 128, 130, 132 and 134. Synchronizers 120/122, 124/126, 128/130, 132/134 are a left and right side of synchronizer assemblies, sharing a common synchronizer hub and sleeve. Synchronizer 120 is selectively engageable to connect gear 44 with first countershaft 26 for common rotation therewith. Synchronizer 122 is selectively engageable to connect gear 66 with first countershaft 26 for common rotation therewith. Synchronizer 124 is selectively engageable to connect gear 52 with second countershaft 28 for common rotation therewith. Synchronizer 126 is selectively engageable to connect gear 64 with second countershaft 28 for common rotation therewith. Synchronizer 128 is selectively engageable to connect gear 76 with first countershaft 26 for common rotation therewith.

Synchronizer 130 is selectively engageable to connect gear 94 with first countershaft 26 for common rotation therewith. Synchronizer 132 is selectively engageable to connect gear 74 with countershaft 28 for common rotation therewith. Synchronizer 134 is selectively engageable to connect gear 84 with second countershaft 28 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 120, 122, 124, 126, 128, 130, 132 and 134. Those skilled in the art will readily understand that a different speed ratio is associated with each torque ratio.

To establish the reverse torque ratio, clutch element 36 of the dual clutch 30 and synchronizer 124 are engaged. By this engagement, clutch element 36 of the dual clutch 30 transfers torque from the input shaft 12 through clutch housing 32 to the second interconnecting shaft 24. Further, torque is transferred from the second interconnecting shaft 24 through gear 42 to idler gear 46. Idler gear 46 is connected for common rotation to idler gear 54. Idler gear 54 transfers the torque to gear 52. Upon engagement of synchronizer 124, gear 52 transfers torque to second countershaft 28. Countershaft 28 transfers the torque to gear 102. Gear 102 transfers torque to gear 104, which in turn transfers the torque to output shaft 14. Output shaft 14 transfers the torque to the final drive unit 18.

A first forward torque ratio (1st gear) is achieved by engaging clutch element 34 of the dual clutch 30 and synchronizer 130. By this engagement, clutch element 34 of the dual clutch 30 transfers torque from the input shaft 12 through clutch housing 32 to the first interconnecting shaft 22. Further, torque is transferred from the first interconnecting shaft 22 to gear 92. Gear 92 transfers the torque to gear 94. Upon engagement of synchronizer 130, gear 94 transfers torque to first countershaft 26. First countershaft 26 transfers the torque to gear 106. Gear 106 transfers torque to gear 104, which in turn transfers the torque to output shaft 14. Output shaft 14 transfers the torque to the final drive unit 18.

A subsequent forward torque ratio (2nd gear) is established by engagement of clutch element 36 of the dual clutch 30 and synchronizer 120. By this engagement, clutch element 36 of the dual clutch 30 transfers torque from the input shaft 12 through clutch housing 32 to the second interconnecting shaft 24. Further, torque is transferred from the second interconnecting shaft 24 to gear 42. Gear 42 transfers the torque to gear 44. Upon engagement of synchronizer 120, gear 44 transfers torque to first countershaft 26. First countershaft 26 transfers the torque to gear 106. Gear 106 transfers torque to gear 104, which in turn transfers the torque to output shaft 14. Output shaft 14 transfers the torque to the final drive unit 18.

A subsequent torque ratio (3rd gear) is established by engagement of clutch element 34 of the dual clutch 30 and synchronizer 128. By this engagement, clutch element 34 of the dual clutch 30 transfers torque from the input shaft 12 through clutch housing 32 to the first interconnecting shaft 22. Further, torque is transferred from the first interconnecting shaft 22 to gear 72. Gear 72 transfers the torque to gear 76. Upon engagement of synchronizer 128, gear 76 transfers torque to first countershaft 26. First countershaft 26 transfers the torque to gear 106. Gear 106 transfers torque to gear 104, which in turn transfers the torque to output shaft 14. Output shaft 14 transfers the torque to the final drive unit 18.

A next subsequent forward torque ratio (4th gear) is established by engagement of clutch element 36 of the dual clutch 30 and synchronizer 122. By this engagement, clutch element 36 of the dual clutch 30 transfers torque from the input shaft 12 through clutch housing 32 to the second interconnecting shaft 24. Torque is then transferred from the second interconnecting shaft 24 to gear 62. Gear 62 transfers the torque to gear 66. Further, upon engagement of synchronizer 122, gear 66 transfers torque to first countershaft 26. First countershaft 26 transfers the torque to gear 106. Gear 106 transfers torque to gear 104, which in turn transfers the torque to output shaft 14. Output shaft 14 transfers the torque to the final drive unit 18.

A subsequent torque ratio (5th gear) is established by engagement of clutch element 34 of the dual clutch 30 and synchronizer 132. By this engagement, clutch element 34 of the dual clutch 30 transfers torque from the input shaft 12 through clutch housing 32 to the first interconnecting shaft 22. Torque is then transferred from shaft 22 to the gear 72. Gear 72 transfers the torque to gear 74. Further, upon engagement of synchronizer 132 the torque is transferred from the gear 74 to countershaft 28. Second countershaft 28 transfers the torque to gear 102. Gear 102 transfers torque to gear 104, which in turn transfers the torque to output shaft 14. Output shaft 14 transfers the torque to the final drive unit 18.

A subsequent torque ratio (6th gear) is established by engagement of clutch element 36 of the dual clutch 30 and synchronizer 126. By this engagement, clutch element 36 of the dual clutch 30 transfers torque from the input shaft 12 through clutch housing 32 to the second interconnecting shaft 24. Further, torque is transferred from the second interconnecting shaft 24 to gear 62. Gear 62 transfers the torque to gear 64. Further, upon engagement of synchronizer 126 the torque is transferred from the gear 64 to the second countershaft 28. Second countershaft 28 transfers the torque to gear 102. Gear 102 transfers torque to gear 104, which in turn transfers the torque to output shaft 14. Output shaft 14 transfers the torque to the final drive unit 18.

A subsequent torque ratio (7th gear) is established by engagement of clutch element 34 of the dual clutch 30 and synchronizer 134. By this engagement, clutch element 34 of the dual clutch 30 transfers torque from the input shaft 12 through clutch housing 32 to the first interconnecting shaft 22. Further, torque is transferred from the first interconnecting shaft 22 to gear 82. Gear 82 transfers the torque to gear 84. Further, upon engagement of synchronizer 134 the torque is transferred from the gear 84 to the second countershaft 28. Gear 84 transfers torque to second countershaft 28. Second countershaft 28 transfers the torque to gear 102. Gear 102 transfers torque to gear 104, which in turn transfers the torque to output shaft 14. Output shaft 14 transfers the torque to the final drive unit 18.

The present invention contemplates that a variety of torque ratios (i.e., the ratio of torque of the output member 14 to the input member 12) are achievable through the selection of tooth counts of the gears of the transmission 10. Moreover, the present invention advantageously provides the transfer gears 102, 104 and 106 in a single plane. This arrangement provides the opportunity to achieve reduced transmission length in comparison with double plane transfer gears. Further, flexibility is provided in the selection of gear ratios with respect to 1st, 2nd and 7th gear, which utilize single mesh pinions (i.e. separate pinions for each gear). The double idler for the reverse gears provides very good opportunity/flexibility to achieve the desired reverse gear ratios.

In yet another embodiment of the present invention, a parking gear 150 is provided. Parking gear 150, as shown in FIG. 1, is connected for common rotation with output shaft 14. Upon activation of a parking actuator (not shown) parking gear 150 is rotationally fixed and, thus, prevents output shaft 14 from rotating. The present invention contemplates that parking gear 150 may be located at other locations along output shaft 14.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   an idler shaft;
   a first, second, third, fourth, fifth, sixth, and seventh gear set each having at least a first gear and a second gear, wherein the output member is continuously connected with one of the gear sets, wherein the first gear set includes a third gear continuously connected to the idler shaft and intermeshed with the first gear of the first gear set, and wherein the third gear set includes a third gear and the first gear of the third gear set is intermeshed with the third gear and the second gear of the third gear set;
   a first interconnecting member continuously connected to the fourth, fifth, and sixth gear sets;
   a second interconnecting member continuously connected with the first and third gear sets;
   a first countershaft continuously connected to the seventh gear set;
   a second countershaft continuously connected to the seventh gear set;
   a dual clutch assembly selectively engageable to interconnect the input member with one of the first interconnecting member and the second interconnecting member; and
   four synchronizer assemblies each for selectively coupling one of the first, second, third, fourth, fifth, and sixth gear sets with one of the first and second countershafts,
   wherein the dual clutch assembly and four synchronizer assemblies are selectively engageable in combinations of at least two to establish at least seven forward speed ratios and at least one reverse speed ratio between the input member and the output member.

2. The transmission of claim 1 wherein the first countershaft is located radially outward from and parallel to the input member.

3. The transmission of claim 2 wherein the second countershaft is located radially outward from and parallel to the input member.

4. The transmission of claim 3 wherein the output member is located radially outward from and parallel to the input member.

5. The transmission of claim 4 wherein the first interconnecting member is located within and concentric with the second interconnecting member.

6. The transmission of claim 5 further comprising a torque converter continuously connected with the input member.

7. The transmission of claim 1 wherein the dual clutch assembly includes a first clutch for selectively connecting the input member with the first interconnecting member.

8. The transmission of claim 7 wherein the dual clutch assembly includes a second clutch for selectively connecting the input member with the second interconnecting member.

9. The transmission of claim 1 wherein the first gear and second gear within each of the first, second, third, fourth, fifth, sixth, and seventh gear sets are radially aligned.

10. The transmission of claim 9 wherein the idler shaft is located radially outward from and parallel to the first countershaft.

11. The transmission of claim 10 wherein the second gear of the second gear set is continuously connected to the idler shaft, and wherein the first gear and the second gear of the second gear set are intermeshed.

12. The transmission of claim 11 wherein the fourth gear set includes a third gear and the first gear of the fourth gear set is intermeshed with the third gear and the second gear of the fourth gear set.

13. The transmission of claim 12 wherein the seventh gear set includes a third gear and the first gear of the seventh gear set is intermeshed with the third gear and the second gear of the seventh gear set.

14. The transmission of claim 13 wherein the first, second, and third gears of the first, third, fourth and seventh gear sets are radially aligned.

15. The transmission of claim 1 wherein a first of the four synchronizer assemblies selectively connects one of the first gear set and the third gear set to the first countershaft.

16. The transmission of claim 15 wherein a second of the four synchronizer assemblies selectively connects one of the second gear set and the third gear set to the second countershaft.

17. The transmission of claim 16 wherein a third of the four synchronizer assemblies selectively connects one of the fourth gear set and the sixth gear set to the first countershaft.

18. The transmission of claim 17 wherein a fourth of the four synchronizer assemblies selectively connects one of the fourth gear set and the fifth gear set to the second countershaft.

19. The transmission of claim 1 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set.

20. The transmission of claim 1 wherein the output member is continuously connected with the seventh gear set.

21. A transmission comprising:
    an input member;
    an output member;
    a first, second, third, fourth, fifth, sixth, and seventh gear set each having at least a first gear and a second gear, wherein the output member is continuously connected with the seventh gear set;
    a first interconnecting member continuously connected to the fourth, fifth, and sixth gear sets;
    a second interconnecting member continuously connected with the first and third gear sets;
    a first countershaft continuously connected to the seventh gear set;
    a second countershaft continuously connected to the seventh gear set;
    a dual clutch assembly selectively engageable to interconnect the input member with one of the first interconnecting member and the second interconnecting member;
    a first synchronizer assembly for selectively connecting one of the first gear set and the third gear set to the first countershaft;
    a second synchronizer assembly for selectively connecting one of the second gear set and the third gear set to the second countershaft;

a third synchronizer assembly for selectively connecting one of the fourth gear set and the sixth gear set to the first countershaft;
a fourth synchronizer assembly for selectively connecting one of the fourth gear set and the fifth gear set to the second countershaft, and
wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, and
wherein the dual clutch assembly and four synchronizer assemblies are selectively engageable in combinations of at least two to establish at least seven forward speed ratios and at least one reverse speed ratio between the input member and the output member.

22. The transmission of claim 21 wherein the first, third, fourth, and seventh gear sets each include a third gear, wherein the first, second, and third gear of each of the first, third, fourth, and seventh gear sets are radially aligned, and wherein the first and second gear of each of the second, fifth, and sixths gear sets are radially aligned.

23. The transmission of claim 22 further comprising a parking gear connected to the output member for selectively fixing the output member from rotation.

\* \* \* \* \*